US010968360B2

(12) United States Patent
Fuhr

(10) Patent No.: US 10,968,360 B2
(45) Date of Patent: *Apr. 6, 2021

(54) METHODS OF PREPARING POROUS WOOD PRODUCTS FOR PAINTING AND FINISHING

(71) Applicant: PRESSING DEVELOPMENTS, L.L.C., Georgetown, TX (US)

(72) Inventor: Adam Curtis Fuhr, Georgetown, TX (US)

(73) Assignee: Pressing Developments, L.L.C., Georgetown, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/556,182

(22) Filed: Aug. 29, 2019

(65) Prior Publication Data

US 2019/0382609 A1    Dec. 19, 2019

Related U.S. Application Data

(63) Continuation of application No. 15/863,656, filed on Jan. 5, 2018, now Pat. No. 10,400,127, which is a
(Continued)

(51) Int. Cl.
| | |
|---|---|
| *C09D 15/00* | (2006.01) |
| *C09D 133/14* | (2006.01) |
| *C09D 135/02* | (2006.01) |
| *B05D 3/06* | (2006.01) |
| *B05D 7/06* | (2006.01) |
| *B05D 7/00* | (2006.01) |

(Continued)

(52) U.S. Cl.
CPC .............. *C09D 15/00* (2013.01); *B05D 3/067* (2013.01); *B05D 7/06* (2013.01); *B05D 7/586* (2013.01); *C09D 4/00* (2013.01); *C09D 133/14* (2013.01); *C09D 135/02* (2013.01); *B05D 1/02* (2013.01); *B05D 7/546* (2013.01); *C08K 3/34* (2013.01)

(58) Field of Classification Search
CPC ........ C09D 15/00; C09D 4/00; C09D 133/14; C09D 135/02; B05D 7/06; B05D 7/586; B05D 3/067; B05D 7/546; B05D 1/02; C08K 3/34; C08F 222/1006
See application file for complete search history.

(56) References Cited

U.S. PATENT DOCUMENTS 3,016,293 A * 1/1962 Cybriwsky ............ C25D 11/18
                                                            8/485
7,151,123 B2 * 12/2006 Ramsey ................... B05D 7/14
                                                            522/96
(Continued)

*Primary Examiner* — Anita K Alanko
(74) *Attorney, Agent, or Firm* — Rodney J. Fuller; Booth Udall Fuller, PLC

(57) ABSTRACT

Methods of preparing porous wood products for painting or finishing are described. The methods comprise applying to a porous wood product a UV-curable coating and curing by UV light the top UV curable coating to 70% to 95% cure, preferably 85% to 95% for spray-applied top UV curable coatings to produce a partially cured porous wood product. The methods typically further include the step of sanding the surface of the partially cured porous wood product and painting or staining, for example with a water-based or solvent-based stain or paint.

20 Claims, 8 Drawing Sheets

Related U.S. Application Data continuation-in-part of application No. 15/192,991, filed on Jun. 24, 2016, now Pat. No. 10,017,661.

(60) Provisional application No. 62/248,738, filed on Oct. 30, 2015, provisional application No. 62/187,104, filed on Jun. 30, 2015.

(51) Int. Cl.
*C09D 4/00* (2006.01)
*C08K 3/34* (2006.01)
*B05D 1/02* (2006.01)

(56) References Cited

U.S. PATENT DOCUMENTS

| | | | |
|---|---|---|---|
| 2005/0245636 A1* | 11/2005 | Fechter | C08F 265/04 522/178 |
| 2006/0029825 A1* | 2/2006 | Chen | B05D 7/57 428/537.1 |
| 2006/0222829 A1* | 10/2006 | E. Dean | B05D 7/08 428/195.1 |
| 2008/0027154 A1* | 1/2008 | Ramsey | A01N 59/14 522/7 |
| 2008/0271842 A1* | 11/2008 | Schoning | B32B 21/13 156/275.5 |
| 2010/0040797 A1* | 2/2010 | Brandenburger | C04B 41/009 427/496 |
| 2010/0276059 A1* | 11/2010 | Tian | C08F 283/008 156/71 |
| 2010/0323209 A1* | 12/2010 | Morgeneyer | C09D 123/26 428/452 |
| 2012/0021207 A1* | 1/2012 | Martin | B27K 3/0207 428/332 |
| 2012/0064312 A1* | 3/2012 | Lokai | C08K 5/0025 428/201 |
| 2012/0301738 A1* | 11/2012 | Posey | C09D 15/00 428/514 |
| 2012/0308734 A1* | 12/2012 | Deruyttere | C09D 4/06 427/487 |
| 2013/0131268 A1* | 5/2013 | Buckmann | C09D 4/00 524/850 |
| 2015/0252209 A1* | 9/2015 | Tian | C09D 133/14 428/413 |
| 2017/0073543 A1* | 3/2017 | Joecken | C04B 41/009 |

\* cited by examiner

| | | 1st Coat | 2nd Coat | 3rd Coat | |
|---|---|---|---|---|---|
| MDF or HDF Boards | *Application Weight* | 28-85 g/m² | n/a | n/a | One Coat Process |
| | *Curing Energy* | 435-525 mJ/cm² | n/a | n/a | |
| | *Curing Amount* | 75-90% | n/a | n/a | |
| | *Application Weight* | 28-130 g/m² (total for both coats) | | n/a | Two Coat Process |
| | *Curing Energy* | 290-525 mJ/cm² | 435-525 mJ/cm² | n/a | |
| | *Curing Amount* | 50-90% | 75-90% | n/a | |
| | *Application Weight* | 28-165 g/m² (total for all three coats) | | | Three Coat Process |
| | *Curing Energy* | 290-525 mJ/cm² | 350-525 mJ/cm² | 495-583 mJ/cm² | |
| | *Curing Amount* | 50-90% | 60-90% | 85-95% | |
| Particale Boards | *Application Weight* | 45-90 g/m² | n/a | n/a | One Coat Process |
| | *Curing Energy* | 435-525 mJ/cm² | n/a | n/a | |
| | *Curing Amount* | 75-90% | n/a | n/a | |
| | *Application Weight* | 45-130 g/m² (total for both coats) | | n/a | Two Coat Process |
| | *Curing Energy* | 290-525 mJ/cm² | 435-525 mJ/cm² | n/a | |
| | *Curing Amount* | 50-90% | 75-95% | n/a | |
| | *Application Weight* | 45-165 g/m² (total for all three coats) | | | Three Coat Process |
| | *Curing Energy* | 290-525 mJ/cm² | 350-525 mJ/cm² | 495-583 mJ/cm² | |
| | *Curing Amount* | 50-90% | 60-90% | 85-95% | |

FIG. 9

|  |  | 1st Coat | 2nd Coat | 3rd Coat |  |
|---|---|---|---|---|---|
| MDF or HDF Boards | *Application Weight* | 28-85 g/m² | n/a | n/a | One Coat Process |
|  | *Curing Energy* | 495-525 mJ/cm² | n/a | n/a |  |
|  | *Curing Amount* | 85-95% | n/a | n/a |  |
|  | *Application Weight* | 28-130 g/m² (total for both coats) | | n/a | Two Coat Process |
|  | *Curing Energy* | 290-495 mJ/cm² | 495-525 mJ/cm² | n/a |  |
|  | *Curing Amount* | 50-85% | 85-95% | n/a |  |
|  | *Application Weight* | 28-165 g/m² (total for all three coats) | | | Three Coat Process |
|  | *Curing Energy* | 290-435 mJ/cm² | 350-435 mJ/cm² | 495-583 mJ/cm² |  |
|  | *Curing Amount* | 50-75% | 60-75% | 85-95% |  |
| Particale Boards | *Application Weight* | 45-90 g/m² | n/a | n/a | One Coat Process |
|  | *Curing Energy* | 435-495 mJ/cm² | n/a | n/a |  |
|  | *Curing Amount* | 75-85% | n/a | n/a |  |
|  | *Application Weight* | 45-130 g/m² (total for both coats) | | n/a | Two Coat Process |
|  | *Curing Energy* | 290-525 mJ/cm² | 435-495 mJ/cm² | n/a |  |
|  | *Curing Amount* | 50-90% | 75-85% | n/a |  |
|  | *Application Weight* | 45-165 g/m² (total for all three coats) | | | Three Coat Process |
|  | *Curing Energy* | 290-525 mJ/cm² | 350-435 mJ/cm² | 495-583 mJ/cm² |  |
|  | *Curing Amount* | 50-90% | 60-75% | 85-95% |  |

FIG. 10

|  |  | 1st Coat | 2nd Coat | 3rd Coat |  |
|---|---|---|---|---|---|
| MDF or HDF Boards | Application Weight | 28-85 g/m² | n/a | n/a | One Coat Process |
|  | Curing Energy | 435-583 mJ/cm² | n/a | n/a |  |
|  | Curing Amount | 75-95% | n/a | n/a |  |
|  | Application Weight | 28-130 g/m² (total for both coats) | | n/a | Two Coat Process |
|  | Curing Energy | 290-525 mJ/cm² | 435-583 mJ/cm² | n/a |  |
|  | Curing Amount | 50-90% | 75-95% | n/a |  |
|  | Application Weight | 28-165 g/m² (total for all three coats) | | | Three Coat Process |
|  | Curing Energy | 290-525 mJ/cm² | 290-525 mJ/cm² | 495-583 mJ/cm² |  |
|  | Curing Amount | 50-90% | 50-90% | 85-95% |  |
| Particale Boards | Application Weight | 45-90 g/m² | n/a | n/a | One Coat Process |
|  | Curing Energy | 435-583 mJ/cm² | n/a | n/a |  |
|  | Curing Amount | 75-95% | n/a | n/a |  |
|  | Application Weight | 45-130 g/m² (total for both coats) | | n/a | Two Coat Process |
|  | Curing Energy | 290-525 mJ/cm² | 435-583 mJ/cm² | n/a |  |
|  | Curing Amount | 50-90% | 75-95% | n/a |  |
|  | Application Weight | 45-165 g/m² (total for all three coats) | | | Three Coat Process |
|  | Curing Energy | 290-583 mJ/cm² | 350-525 mJ/cm² | 495-583 mJ/cm² |  |
|  | Curing Amount | 50-100% | 60-90% | 85-95% |  |

FIG. 11

METHODS OF PREPARING POROUS WOOD PRODUCTS FOR PAINTING AND FINISHING

RELATED APPLICATIONS

This application is a continuation of U.S. patent application Ser. No. 15/863,656, filed on Jan. 5, 2018 (published as US20180127613), which is a continuation-in-part application of U.S. application Ser. No. 15/192,991 filed on Jun. 24, 2016 (now U.S. Pat. No. 10,017,661), which claims the benefit of U.S. Provisional Application No. 62/248,738 filed on Oct. 30, 2015 and U.S. Provisional Application No. 62/187,104 filed on Jun. 30, 2015, the contents of each of the which are incorporated herein by reference thereto in their entireties.

TECHNICAL FIELD

This disclosure relates to methods and compositions of preparing porous wood products for painting and finishing, including methods for spray-applying compositions to porous wood products in preparation of painting and finishing to improve the quality of the finished product.

BACKGROUND

Painted wood products are in high demand in the market. Traditional cabinet and furniture manufacturers include "painted" products in their offering. The cabinet industry, for example, offers about 40% of the entire offering in painted finishes. These painted finishes take multiple steps to accomplish the final product and are typically produced on hardwood veneer panels for every end panel and some interior panels as well. Hardwood veneers, however, are costly and also not sustainable.

On the other hand, the cost of porous panel products is drastically lower than hardwood veneers. These products are also much more sustainable as they are by-products of the woodworking industry globally. Porous panel products include medium-density fiberboard (MDF), high-density fiberboard (HDF), medium-density overlay (MDO), and high-density overlay (HDO). These boards are being used to replace much more expensive hardwood veneer panels and can provide a much higher finishing capability than the hardwood veneer panels. The porous nature of these products, however, require proper sealing to increase resistance to warping, expansion, shrinkage, or water damage.

Accordingly, there is a need for methods of sealing porous wood products to achieve the same or better results in the final painting process than sealing hardwood while not increasing the finishing steps involved. These methods would also significantly reduce the end user's structural cost. There is also need to provide a method of producing a high-quality, professional look similar to hardwood veneer panels or better. Finally, there is a need for methods that coat porous wood materials with various shapes that mimic the quality and look of finished hardwood.

BRIEF SUMMARY OF THE INVENTION

The present invention is directed to methods of preparing a porous wood product for painting or staining to improve the quality of a finishing coat. The method typically includes applying to the porous wood product a top UV-curable coating. In certain embodiments the top UV-curable coating includes at least one filler; partially cured to 70-95% cure, more preferably 80-95% cure or 85-95% cure; and sanded after partial curing. When spray-applying the UV-curable coat partially curing the top UV-curable coating is preferable. A typical UV curing energy for the top UV-curable coating is 435-583 mJ/cm$^2$.

The methods of the invention generally include applying at least one non-top UV-curable coating, e.g. 1, 2, or 3, and partially curing the non-top UV-curable coating before, applying onto the partially cured porous wood product the top UV-curable coating. The disclosed methods include compositions and procedures for spray-applying the UV-curable coatings. In one exemplary embodiment, the porous wood product has one or more side portions and the UV-curable coating is spray-applied to the one or more side portions. Preferably at least two UV-curable coatings are spray-applied to the one or more side portions and the top UV-curable coating is partially cured to 85-95% cure. It is also preferable that the one or more side portions are sanded before applying a UV-curable coating. In certain aspects of the disclosed method, at least the partially cured top UV-curable coating is also sanded and more preferably each partially cured UV-curable coating is sanded.

In one non-limiting embodiment, the method also includes applying a water-based tie coat to the porous wood product prior to applying a UV-curable coating.

The UV-curable coatings in certain embodiments are spray-applied. Typically there are between one and four UV-curable coatings, e.g., two or three. Advantageously, each UV curable coating is preferably sanded after partially curing, or at least the top UV curable coating is sanded before applying a finishing coat of paint or stain to the partially cured top UV curable coating. In an exemplary embodiment, the porous wood product is sanded, with 180 grit sandpaper in preparation for applying the first UV-curable coating. For the highest quality, each UV-curable coating is sanded after partially curing, for example, using 180 or 220 grit sandpaper, with the top UV-curable coating also being sanded after partially curing, preferably with finer sand paper, for example, using 320-400 grit sandpaper.

The top UV-curable coating is preferably applied with an application weight of 65-85 g/m$^2$ if one UV-curable coat is applied; 45-65 g/m$^2$ per layer if two UV-curable coats are applied; and 35-55 g/m$^2$ per layer if three UV-curable coats are applied. In a non-limiting embodiment, at least two UV-curable coatings are applied prior to spray-applying the top UV-curable coating; and preferably all of the UV-curable coats are spray-applied. The combined application weight for all UV-curable coatings is typically between 28-165 g/m$^2$ and 35-120 g/m$^2$.

The non-top UV-curable coatings are generally partially cured to 50-80% or 50-70% cure, and the top UV-curable coating is generally partially cured to 70-95% and 85-95% if spray-applied. The UV-curable coating typically comprises at least one filler, for example, at 10-40% or 20%-40% based on the total weight of the coating composition. Preferred fillers include: $CaCO_3$, silica, talc, silicone, Kaolin Clay, feldspar, titanium dioxide, and nepheline syenite. The UV-curable coating also includes at least one monomer additive in certain embodiments, preferably selected from: DPGDA, HDODA, TRPDGA, TMPTA, TMPTMA, TPGDA, HDDA, and PETA.

The UV curable coating may further comprises a photoinitiator selected from the group consisting of: 0.5-3% 2-Hydroxy-2methyl-1-phenyl-1-propanone, 0.5-3% 1-hydroxy-cyclohexyl-phenyl-ketone, and 0.5-3% Benzophenone; wherein the % of the photoinitiator is weight % based on the volume of the coating composition.

A non-limiting specific example of a suitable UV-curable coating composition, based on the total volume of the coating composition, includes: Amine Modified Polyether Acrylate at 25-45%; Dipropylene Glycol Diacrylate at 36-60%; Nepheline Syenite at 7-30%; Feldspar at 6-30%; 2-Hydroxy-2methyl-1-phenyl-1-propanone: 0.5-3%; 1-hydroxy-cyclohexyl-phenyl-ketone at 0.5-3%; and Benzophenone at 0.5-3%.

BRIEF DESCRIPTION OF THE DRAWINGS

Implementations are described in conjunction with the appended drawings, where like designations denote like elements.

Skilled artisans will appreciate that elements in the figures are illustrated for simplicity and clarity and have not necessarily been drawn to scale. For example, the dimensions of some of the elements in the drawings may be exaggerated relative to others to help to improve understanding of implementations.

FIGS. 9-11 depict various embodiments of settings and targets for a process of preparing, and optionally finishing, porous wood products.

DETAILED DESCRIPTION OF A PREFERRED EMBODIMENT

Figure 1:
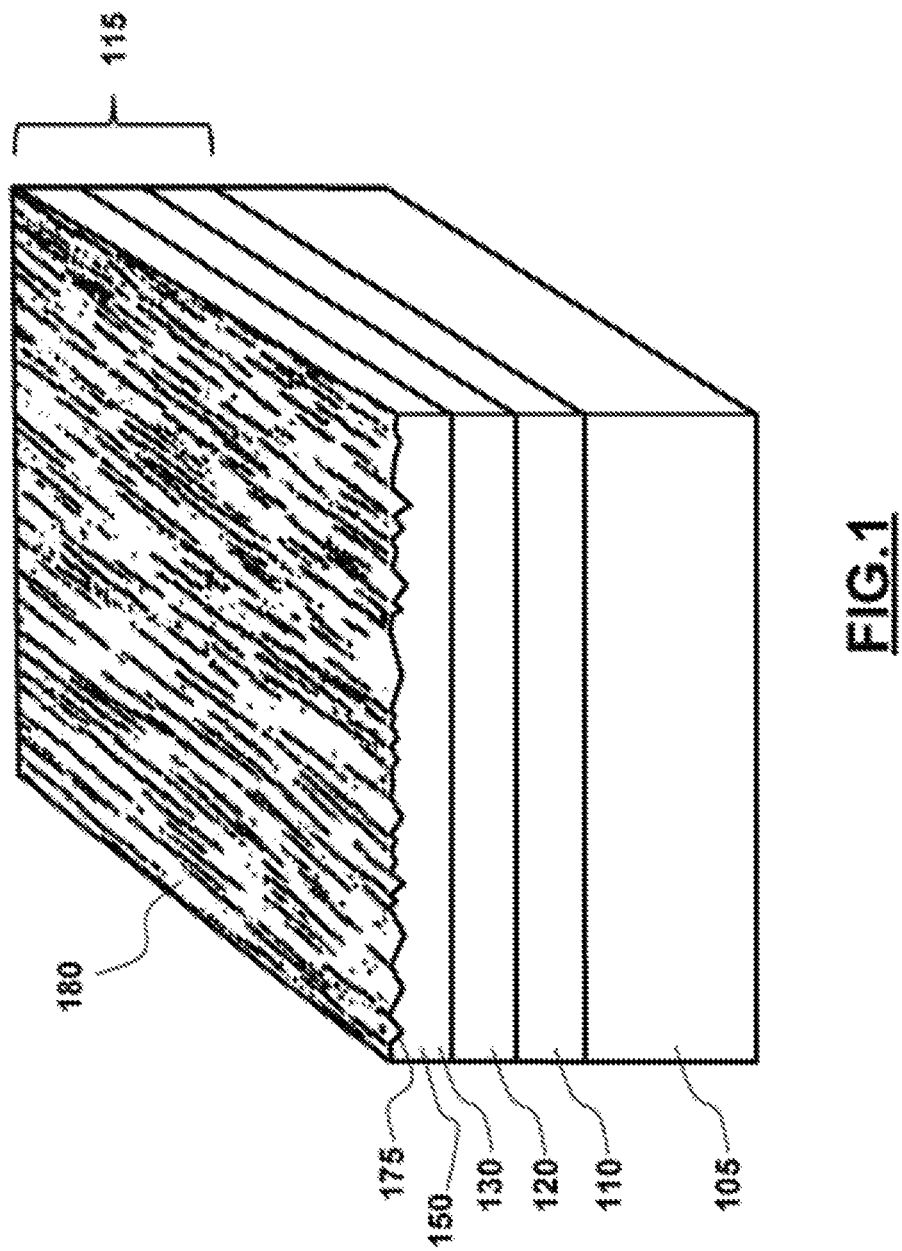
FIG. 1 depicts an example perspective view of a finished porous wood product.

The presently disclosed embodiments relate to the discovery that applying curable coatings to porous wood products and partially cure the top UV-curable coating allow a variety of paints and finishes to adhere to the porous wood product.

Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain and ordinary English meaning to those skilled in the applicable arts.

The verb "comprise" as is used in this description and the claims and its conjugations are used in its non-limiting sense to mean that items following the word are included, but items not specifically mentioned are not excluded. Also, reference to an element by the indefinite article "a" or "an" does not exclude the possibility that more than one of the elements are present unless the context clearly requires that there is one and only one of the elements. The indefinite article "a" or "an" thus usually means "at least one."

The term "porous wood product" refers to engineered wood products, which are composite materials manufactured by binding or fixing the strands, particles, fibers, or boards of woods together with some method of fixation. Specific examples of porous wood products include porous panel products such as medium-density fiberboard (MDF), high-density fiberboard (HDF), medium-density overlay (MDO), high-density overlay (HDO), oriented strand board (OSB), particleboard, chipboard, panel products, and plywood. In preferred embodiments, "porous wood product" refers to a particleboard, chipboard, oriented strand board (OSB), medium-density fiberboard (MDF), high-density fiberboard (HDF), medium-density overlay (MDO), or high-density overlay (HDO).

The term "resin" refers to generally to synthetic materials that are viscous liquids capable of hardening permanently. Examples of resins include polymers, oligomers, acrylics, acrylates, epoxies, urethanes, and polycarbonate.

The term "additive" refers to compounds that make the product flow, level, and/or defoam, for example, a deaerator. Accordingly, additives include surface modifiers, curing agents, and the like.

The term "finishing coating" or "finishing coat" refers to coating layer(s) visible upon completion and final assembly of a product made from porous panel product, such as cabinetry, furniture, millwork, and fixtures. Generally, the finishing coating is applied to the partially cured top UV-curable coat in the disclosed methods and consists of paint, stain, or both.

The terms "top UV-curable coating" or "top coating" refers to the last UV-curable coating applied to the porous wood product.

The term "non-top UV-curable coating" refers to UV-curable coating layer(s) other than the top UV-curable coating layer.

The term "UV-curable coating" refers to the top and/or non-top UV-curable coating layer(s).

The term "partially cured" refers to curing to 97% cure or less, e.g. 50% to 95%, 60% to 95%; 75% to 95%; 80% to 95%; 60% to 90%, 70% to 90%; 85% to 95%, etc.

The present invention confers an advantage in improving the brushability, chemical resistance, color uniformity, coverage, durability, flow, leveling, opacity, sheen uniformity, smoothness, and water resistance of the finishing coating on a porous wood product. Compared to the prior art, preparing the porous wood product according to the disclosed methods results in improved coverage, better flow and enhanced durability of sealing coating, and reduced blemishes on the surface. Furthermore, the surface of porous wood products may be modified, for example, by etching or embossing, to give the appearance of wood, hardwood veneers, non-wood patterns, etc.

The aspects, features, applications, and advantages will be apparent to those of ordinary skill in the art from the specification, drawings, and the claims. References are made to the figure to illustrate selected embodiments and preferred modes of carrying out the invention. It is to be understood that the invention is not hereby limited to those aspects depicted in the figure.

In general, the UV-curable coating formulations comprise at least 97%, at least 98%, at least 99%, or 100% solids and at least 50% resin content. The spray coating formulations can be diluted with a reducing solvent, e.g., N-Butyl Acetate to a preferred viscosity, measured in cP (centipoise) range from 60-125 cP. Unless otherwise noted, spray-application was accomplished using an HVLP (high volume, low pressure) spray system. UV light is used at the specified dose to partially cure the coating. In typical embodiments, the solids are not reduced with a solvent as the preferred formulations have a low enough viscosity to spray as formulated.

In one embodiment of the invention, a water-based tie coat is applied to the porous wood product prior to applying UV-curable coatings to enhance adherence of the UV-curable coatings.

Typically, the UV-curable coating formulations comprise no more than 50% of monomer additives. Preferred monomers include: DPGDA, HDODA, TRPDGA, TMPTA, TMPTMA, TPGDA, HDDA, and PETA. According to an aspect, the UV-curable coatings comprise a monomer additive selected from the group consisting of: TRPDGA, TMPTMA, and PETA. The amount of monomer additive(s) may be 5-50% or any number range in between, e.g., 10-45%, 15-40%, 20-50%, 35-45%, or 40-50%, by weight.

In general, the UV-curable coating formulations comprise a filler selected from the group consisting of: $CaCO_3$, silica, talc, silicone, Kaolin clay, feldspar, titanium dioxide, and nepheline syenite. The amount of filler(s) may be 5-50% or any number range in between, e.g., 5-20%, 5-40%, 10-25%, 10-45%, 10-50%, 15-35%, 15-45%, 20-40%, 25-45%, 30-50%, 35-45%, 40-50%, by weight.

In general, the UV-curable coating formulations comprise a photoinitiator selected from the group consisting of: 2-Hydroxy-2methyl-1-phenyl-1-propanone, 1-hydroxy-cyclohexyl-phenyl-ketone, and Benzophenone. The amount of photoinitiator(s) may be 0.1-3.5% or any number range in between, for example, 0.1-1%, 0.1-1.5%, 0.1-2%, 0.1-2.5%, 0.1-3%, 0.1-3.5%, 0.5-1%, 0.5-1.5%, 0.5-2%, 0.5-2.5%, 0.5-3%, 0.5-3.5%, 1-1.5%, 1-2%, 1-2.5%, 1-3%, 1-3.5%, 1.5-2%, 1.5-2.5%, 1.5-3%, 1.5-3.5%, 2-2.5%, 2.5-3%, or 2.5-3.5%.

In a non-limiting, preferred embodiment, UV-curable coating comprises, by volume:

| | |
|---|---|
| 30-50% | acrylated epoxy; |
| 10-20% | Nepheline syneite; |
| 10-20% | Unsaturated polyester resin; |
| 10-20% | Trpdga; |
| 1-10% | 1,6-hexanediol diacrylate; |
| 1-10% | Magnesium silicate hydrate; |
| 1-10% | Acrylated amine; |
| 1-10% | 1-hydroxycyclohecyl phenyl ketone; |
| 1-10% | Amorphous fumed silica; |
| 1-10% | Dipropyleneglycol diacrylate; |
| 1-10% | Benzophenone; |
| <0.1% | Ethylbenzene; |
| <0.1% | Toluene; |
| <0.1% | Naphthalene; and |
| <0.1% | Benzene. |

In general, the spray-applicable UV-curable coating formulations comprise:
a curable resin;
a reactive diluent;
a photoinitiator; and
a filler.

In a non-limiting, preferred embodiment, the spray-applicable UV-curable coating formulations comprise, by volume:

| | |
|---|---|
| 25-45% | Amine Modified Polyether Acrylate; |
| 36-60% | Dipropylene Glycol Diacrylate; |
| 7-30% | nepheline syenite; |
| 6-30% | Feldspar; |
| 0.5-3% | 2-Hydroxy-2methyl-1-phenyl-1-propanone; |
| 0.5-3% | 1-hydroxy-cyclohexyl-phenyl-ketone; and |
| 0.5-3% | Benzophenone. |

An aspect of the present invention provides applying a finishing coating of water- or solvent-based paint or stain onto the sealed porous wood product. According to an aspect, the finishing coating further comprises a coating, for example, a varnish or surface film, to seal the stain. According to a further aspect, the coating to seal the stain is a clear coating.

The spray-applicable UV-curable coating formulation can be spray-applied to any portion of the porous wood product. In one embodiment the porous wood product has one or more side portions and the UV-curable coating is spray-applied to at least the one or more side portions, for example, the UV-curable coating is spray-applied to the one or more side portions and roller-applied to the top and bottom portions of the porous wood product. Preferably at least two UV-curable coatings are spray-applied to the one or more side portions and the top UV-curable coating is partially cured to 85-95% cure. In this embodiment, it is also preferable that the one or more side portions are sanded before applying a UV-curable coating, followed by also sanding at least the partially cured top UV-curable coating, but more preferably each partially cured UV-curable coating for the highest quality finish.

The top UV-curable coating is preferably applied with an application weight based on the number of UV-curable coatings applied. Non-limiting examples include, one coat application at 65-85 $g/m^2$; two-coat application at 45-65 $g/m^2$ per layer, and three-coat application at 35-55 $g/m^2$ per layer.

In one embodiment, at least two UV-curable coatings are applied when spray-applying the UV-curable coating, for example two to four layers are spray-applied. If the profile is more complicated, it is preferable that additional UV-curable coatings are applied, e.g., three coatings in total. In addition, before the initial UV-curable coating is applied, it is recommended that the product be sanded, for example, with 180 grit sandpaper. It is also recommended for the highest quality porous wood products that each non-top UV-curable coating be sanded after partial curing, for example, using 180 or 220 grit sandpaper, with the top UV-curable coating also being sanded, preferably with finer sand paper, for example, using 320-400 grit sandpaper.

Depending on the number of UV-curable coatings to be applied to a porous wood product, the application weight consist of: 25-100 $g/m^2$, 30-95 $g/m^2$, 35-85 $g/m^2$, 35-65 $g/m^2$, 45-85 $g/m^2$, 50-85 $g/m^2$, 55-80 $g/m^2$, 60-90 $g/m^2$, 65-85 $g/m^2$, 25-65 $g/m^2$, 30-60 $g/m^2$, 30-55 $g/m^2$, 35-50 $g/m^2$. In a non-limiting, preferred embodiment, the top UV-curable coating may be applied with an application weight selected from the group consisting of: 25-150 $g/m^2$, 25-120 $g/m^2$, 25-90 $g/m^2$, 28-120 $g/m^2$, 28-100 $g/m^2$, 28-80 $g/m^2$, 65-85 $g/m^2$; 45-65 $g/m^2$, and 35-55 $g/m^2$ per layer.

The present invention provides methods for partially curing the top UV-curable coating, for example, partially curing to 45-97%, 50-97%, 60-95%, 65-95%, 70-95%, 70-90%, 70-85%, 70-80%, 75-97%, 75-95%, 80-97%, 80-95%, 85-90%, 85-95%, 85-97%, 90-95%, 90-97%, or 95-97%, including any range between 45% and 97% depending on the embodiment. In a non-limiting, preferred embodiment, the top UV-curable coating is cured to 85-95% cure.

The UV curing energy for curing the top UV-curable coating may be, for example, 430-595 mJ/cm$^2$ and any specific range in between, e.g., 435-595 mJ/cm$^2$, 440-585 mJ/cm$^2$, 450-475 mJ/cm$^2$, 460-540 mJ/cm$^2$, 465-565 mJ/cm$^2$, 470-580 mJ/cm$^2$, 480-590 mJ/cm$^2$, 490-570 mJ/cm$^2$, 500-510 mJ/cm$^2$, 500-570 mJ/cm$^2$, 510-565 mJ/cm$^2$, 440-510 mJ/cm$^2$, 520-590 mJ/cm$^2$, 525-580 mJ/cm$^2$, 540-570 mJ/cm$^2$, 550-565 mJ/cm$^2$, 560-580 mJ/cm$^2$, or 590-595 mJ/cm$^2$. In non-limiting, preferred embodiments, the UV curing energy for curing the top UV-curable coating may be 435-525 mJ/cm$^2$, 435-583 mJ/cm$^2$, 435-495 mJ/cm$^2$, 495-583 mJ/cm$^2$, or 495-525 mJ/cm$^2$. According to one exemplary embodiment of the invention, the UV curing energy used to cure the top UV-curable coating is 435-583 mJ/cm$^2$.

According to an aspect of the present invention, prior to applying the top UV-curable coating onto the porous wood product, a non-top UV-curable coating is applied. The non-top UV-curable coating is preferably partially cured between 45-97% or any specific range in between, for example, 45-95%, 45-90%, 45-85%, 45-80%, 45-75%, 50-95%, 55-75%, 55-90%, 60-95%, In a non-limiting, preferred embodiment, the non-top UV-curable coating is cured to 50-70% cure.

The UV curing energy for curing the non-top UV-curable coating is typically, for example, 280-535 mJ/cm$^2$ or any specific range in between, e.g., 280-530 mJ/cm$^2$, 290-515 mJ/cm$^2$, 300-495 mJ/cm$^2$, 310-485 mJ/cm$^2$, 320-470 mJ/cm$^2$, 330-500 mJ/cm$^2$, 340-495 mJ/cm$^2$, 350-480 mJ/cm$^2$, 360-490 mJ/cm$^2$, 370-515 mJ/cm$^2$, 385-465 mJ/cm$^2$, 395-515 mJ/cm$^2$, 410-510 mJ/cm$^2$, 425-480 mJ/cm$^2$, 435-530 mJ/cm$^2$, 455-485 mJ/cm$^2$, 485-525 mJ/cm$^2$, 525-535 mJ/cm$^2$, and 530-535 mJ/cm$^2$. In a non-limiting, preferred embodiments, the UV curing energy for curing the non-top UV-curable coating is 290-525 mJ/cm$^2$ or 290-495 mJ/cm$^2$.

An example of one aspect of the present invention is applying three UV-curable coatings to the porous wood product. In a non-limiting example, the first UV-curable coating is preferably cured to 50-95%, 50-90%, or 50-75% cure with a UV curing energy of 290-583 mJ/cm$^2$, 290-525 mJ/cm$^2$, or 290-435 mJ/cm$^2$; the second UV-curable coating preferably cured to 50-90%; 60-90%, or 60-75% cure with a UV curing energy for curing the second UV-curable coating may be 350-525 mJ/cm$^2$ or 350-435 mJ/cm$^2$, and the top UV-curable coating is preferably cured to 70-97%, 75-95% or 80-95% with a curing energy of 435-583 mJ/cm$^2$.

An aspect of the invention provides sanding the porous wood product prior to the application of UV-curable coatings. A further aspect of the present invention provides sanding the surface of the partially cured top UV-curable coat. In general, the sanding is done with sandpaper, sanding belt, or sanding disk. The sandpaper, sanding belt, or sanding disk may have a grit selected from the group consisting of: 210 grit, 220 grit, 230 grit, 240 grit, 250 grit, 260 grit, 270 grit, 280 grit, 290 grit, 300 grit, 310 grit, 320 grit, 330 grit, 340 grit, 350 grit, 360 grit, 370 grit, 380 grit, 390 grit, 400 grit, and 410 grit. In non-limiting, preferred embodiments, the sandpaper, sanding belt, or sanding disk may have a grit selected from the group consisting of: 220 grit, 320 grit, and 400 grit.

An aspect of the present invention provides modifying the surface of the porous wood product by etching or embossing. In general, etching may use sandpaper, sanding disc, sanding belt, or laser. In non-limiting, preferred embodiments, the sandpaper, sanding belt, or sanding disk has a grit selected from the group consisting of: 24-80 grit, 24-60 grit, 60-80 grit, 60 grit, and 80 grit.

An aspect of the present invention provides methods of preparing porous wood products for painting or staining, comprising: (a) applying onto a porous wood product a top UV-curable coating; (b) partially curing the top UV-curable coating; and (c) sanding the partially cured top coat.

FIGS. 1-6 illustrate the methods for preparing porous wood products comprising: (a) applying to a porous wood product (105) a UV-curable coating, and (b) curing by UV light the UV-curable coating (115) to 50-95% cure to produce a partially cured porous wood product (105). In some implementations, the porous panel product 105 is selected from the group consisting of an MDF, an HDF, an MDO, and an HDO. In some implementations, the UV curable coating 115 is cured to 50-75% cure, 50-95% cure, and/or 60-95% cure.

Each of the at least one UV curable coatings 115 comprises, by volume, at least 97%, at least 98%, at least 99%, or 100% solids UV curable coating and at least 50% resin content. The UV curable coating 115 may also comprise additives, which includes monomer additives and fillers. However, the percentage of additives in the UV curable coating 115 does not exceed 50% by volume. In preferred embodiments, the monomer additives or the filler additives in the UV curable coating 115 each do not exceed 25% by volume. Examples of monomer additives in the UV curable coating 115 include DiPropylene Glycol Diacrylate (DPGDA), 6-hexanediol diacrylate (HDODA), tripropylene glycol diacrylat (TRPDGA), trimethylolpropane triacrylate (TMPTA), trimethylolpropane trimethacrylate (TMPTMA), tripropylene glycol diacrylate (TPGDA), hexanediol diacrylate (HDDA) or pentaerythritol triacrylate (PETA). Examples of fillers in the UV curable coating 115 include $CaCO_3$, silica, talc, and silicone. A high amount of $CaCO_3$ or silicone (polymerized siloxanes) is not desirable in the UV curable coating 115. Preferably, the UV curable coating 115 comprises, by volume, less than 15%, less than 10%, less than 5%, preferably less than 1% $CaCO_3$. If the filler comprises silicone, the silicone content is less than 1.5% by volume of the UV curable coating 115, though it is preferred that the UV curable coating comprises no silicone. An exemplary UV curable coating 115 is the HC UV Filler from RPM Wood Finishes Group, Inc. (Hickory, N.C.). The composition of the HC UV Filler is depicted in Table 1.

TABLE 1

Composition and information on ingredients of HC UV Filler from RPM Wood Finishes Group, Inc.

| Chemical Name | % Composition (by volume) |
| --- | --- |
| acrylated epoxy | 30-50 |
| nepheline syneite | 10-20 |
| unsaturated polyester resin | 10-20 |
| TRPDGA | 10-20 |
| 1,6-hexanediol diacrylate | 1-10 |
| magnesium silicate hydrate | 1-10 |
| acrylated amine | 1-10 |
| 1-hydroxycyclohecyl phenyl ketone | 1-10 |
| amorphous fumed silica | 1-10 |
| dipropyleneglycol diacrylate | 1-10 |
| benzophenone | 1-10 |

TABLE 1-continued

Composition and information on ingredients of HC UV Filler from RPM Wood Finishes Group, Inc.

| Chemical Name | % Composition (by volume) |
| --- | --- |
| ethylbenzene | <0.1 |
| toluene | <0.1 |
| naphthalene | <0.1 |
| benzene | <0.1 |

Figure 2:
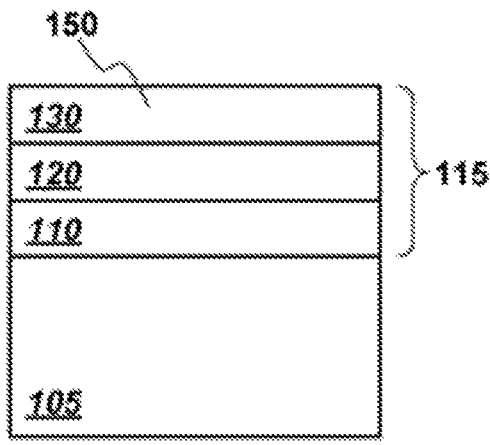
FIGS. 2-4 depict cross-sectional views of porous wood products.
Figure 7A:
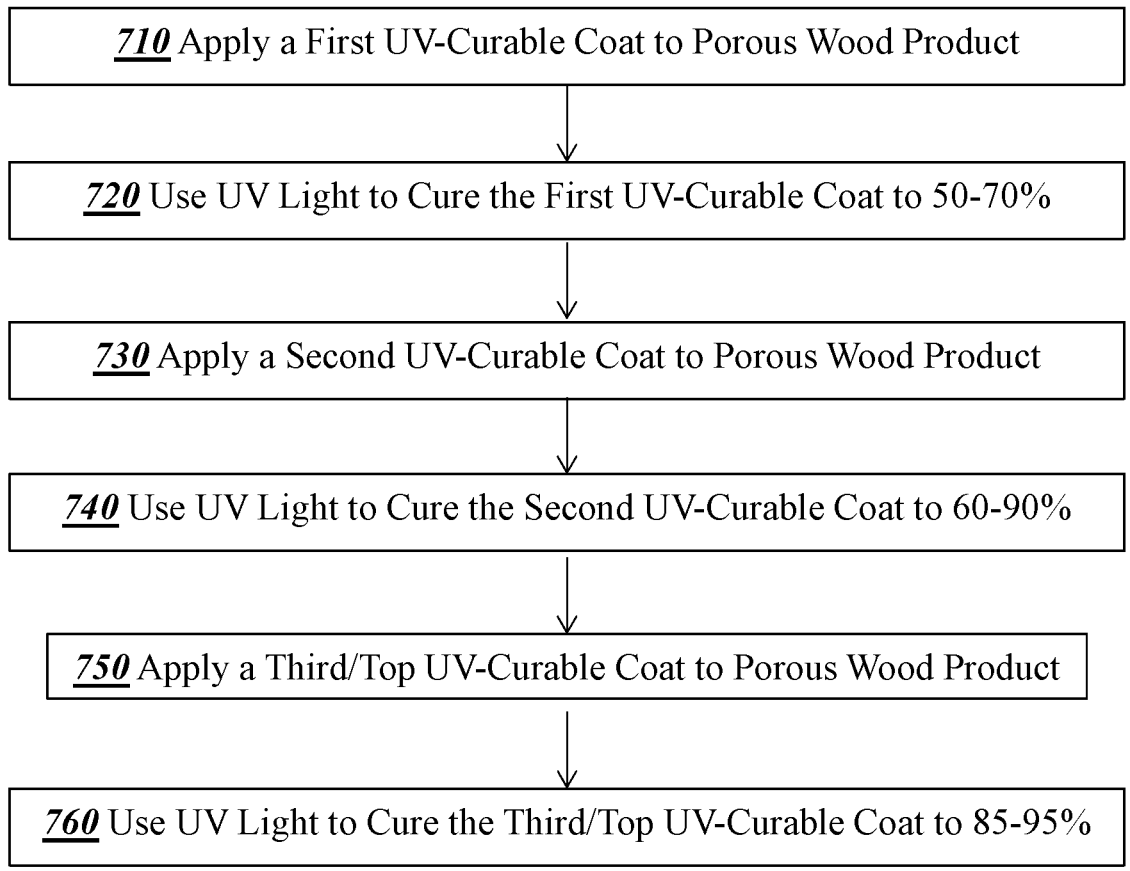
FIGS. 7A-7C depict examples of various embodiments of preparing porous wood products.

FIGS. 2, 7A, and 9 illustrate an exemplary embodiment for preparing a porous wood product (particle, MDF, or HDF board 105) comprising:

(a) applying to the porous wood product a first UV-curable coating 110;

(b) curing by UV light the first UV-curable coating 110 to 50% to 70% cure;

(c) applying to the porous panel product a second UV-curable coating 120;

(d) curing by UV light the second UV-curable coating 120 to 60% to 90% cure;

(e) applying to the porous panel product a third UV-curable coating 130; and (f) curing by UV light the third UV-curable coating 130 to 85% to 95% cure to produce a porous wood product ready for painting or finishing. The first, second, and third UV-curable coatings (110, 120, and 130) may comprise the same or different UV-curable coatings 115.

Figure 3:
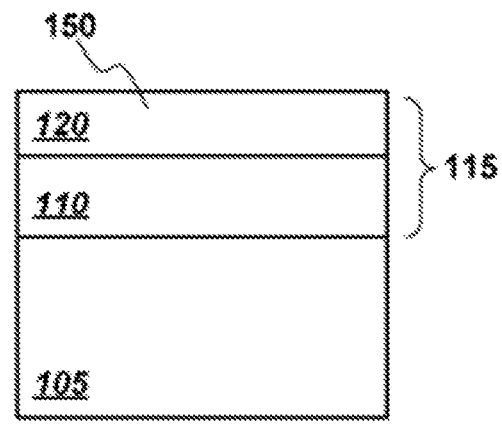
Figure 7B:
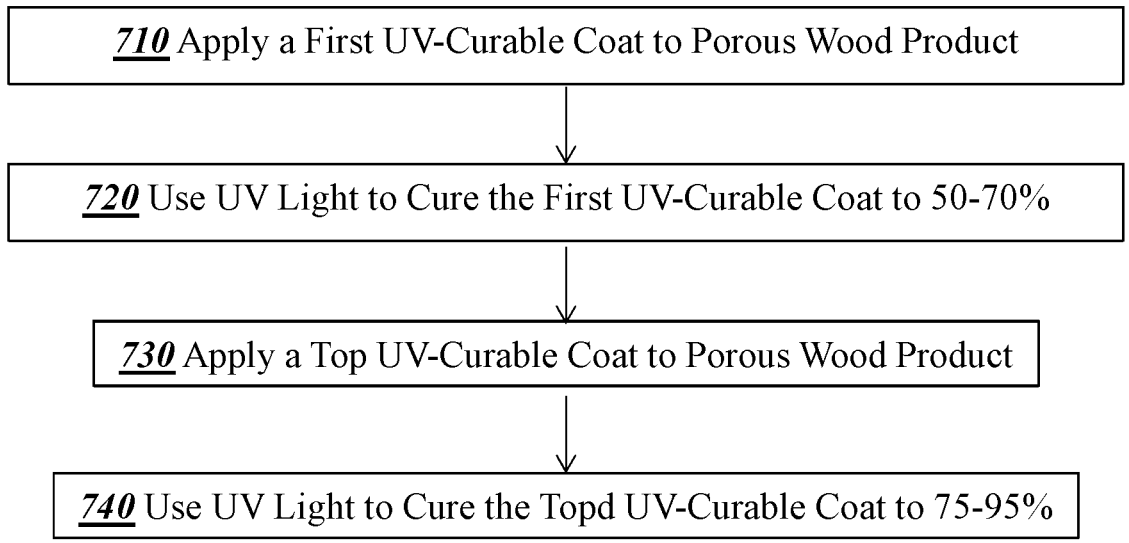

FIGS. 3, 7B, and 10 illustrate an exemplary embodiment for preparing a porous wood product (particle board 105) comprising:

(a) applying to the porous wood product a first UV-curable coating 110;

(b) curing by UV light the first UV-curable coating 110 to 50% to 70% cure;

(c) applying to the porous panel product a second/top UV-curable coating 120; and (d) curing by UV light the second UV-curable coating 120 to 75% to 85% cure to produce a porous wood product ready for painting or finishing.

The first and second UV-curable coatings (110 and 120) may comprise the same or different UV-curable coatings 115.

Figure 4:
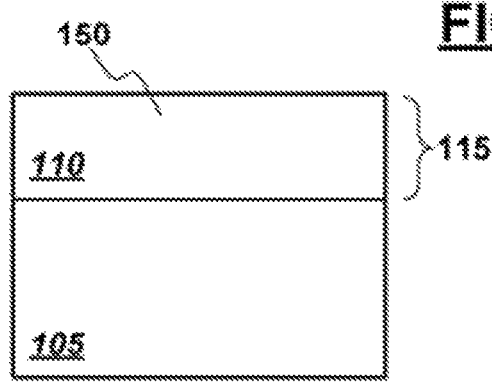
Figure 7C:
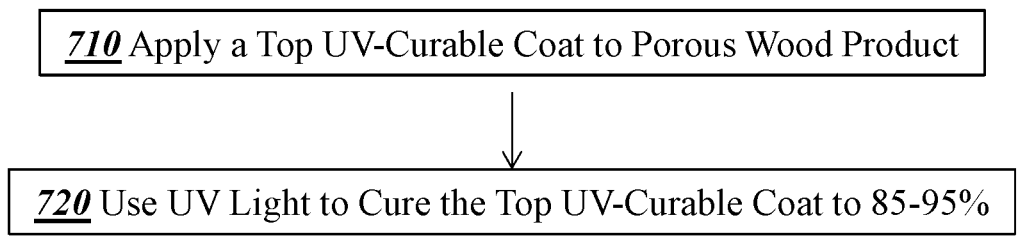

FIGS. 4, 7C, and 10 illustrate an exemplary embodiment for preparing a porous wood product (MDF or HDF board 105) comprising:

(a) applying to the porous wood product a first/top UV-curable coating 110; and (b) curing by UV light the first UV-curable coating 110 to 85% to 90% cure to produce a porous wood product ready for painting or finishing.

Figure 5:
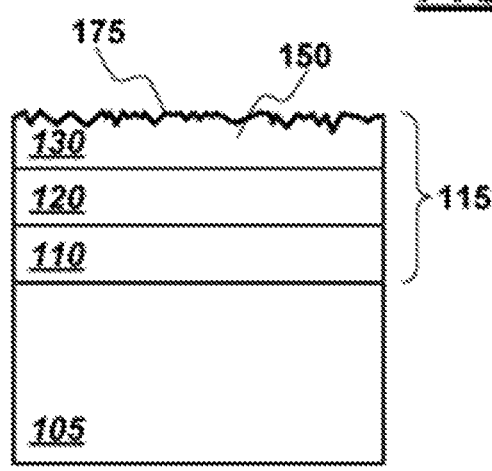
FIGS. 5 and 6 depict cross-sectional views of finished porous wood products.
Figure 6:
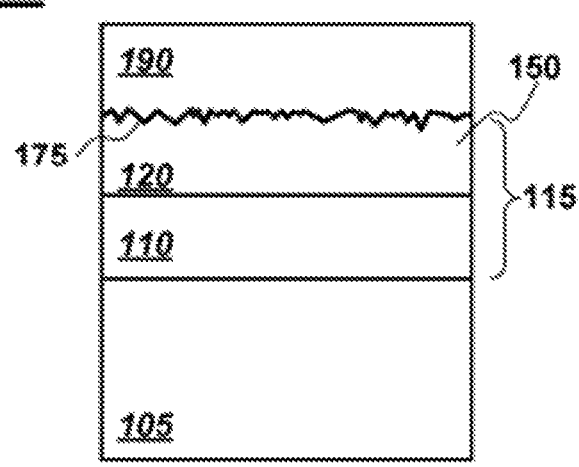

FIG. 5 illustrates methods for finishing a porous wood product 105 comprising (a) applying to a porous panel product 105 at least one UV-curable coating 115;

(b) curing by UV light the at least one UV-curable coating 115 to 50% to 95% cure; and (c) applying to the sealed porous wood product a finishing coating 190. The finishing coating 190 may be paint or some other finishing product.

Figure 8:
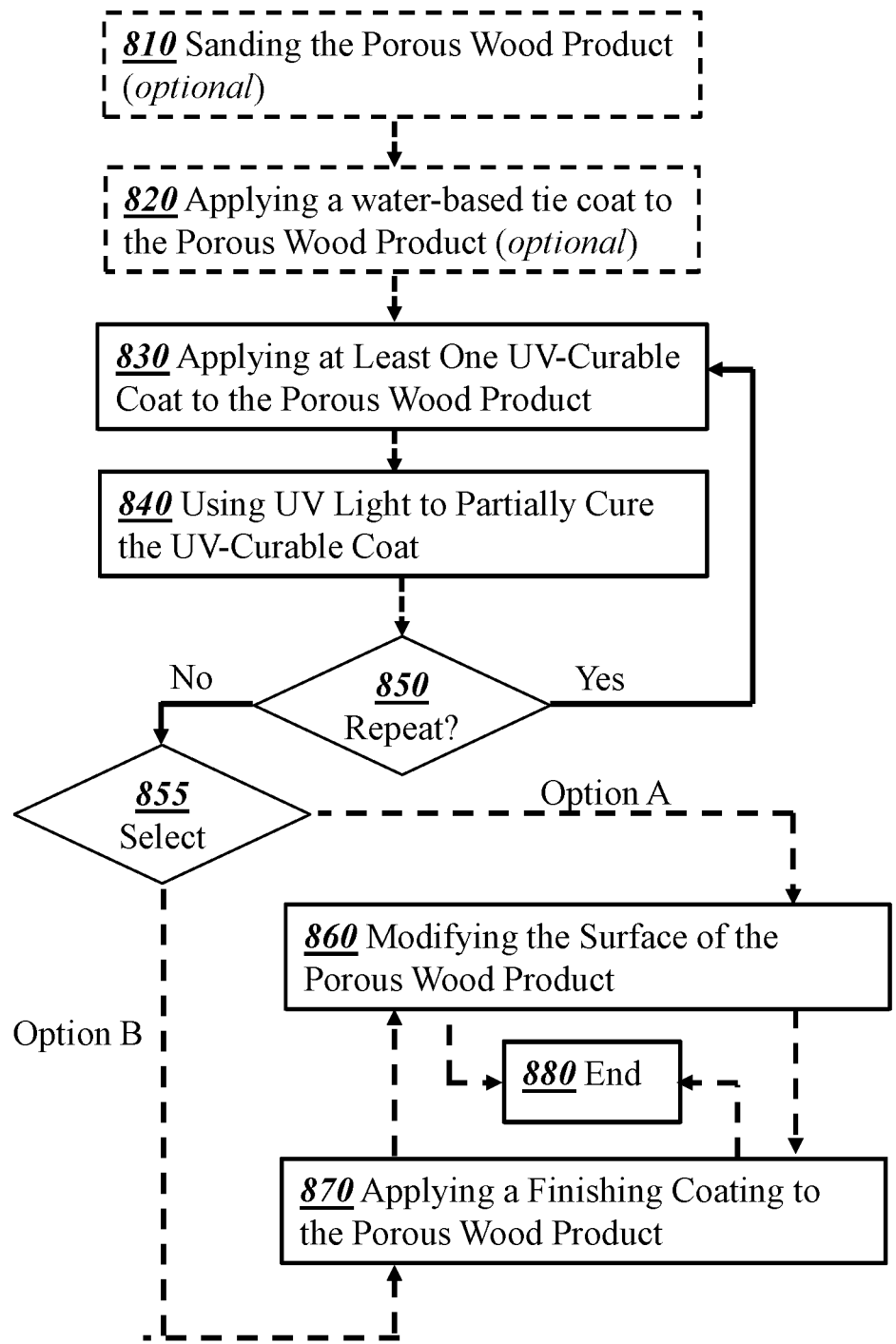
FIG. 8 depicts an example process of preparing and finishing a porous wood product. Optional steps of the process are shown in boxes with dashed lines.

FIG. 8 illustrates exemplary embodiments for preparing a porous wood product. In certain embodiments, the porous wood product is sanded prior to application of the UV curable coating (115) using sandpaper or sanding disk having 180 grit, 220 grit, or 320 grit. Sanding (810) prior to application of the UV curable coating is recommended if the surface of the porous panel product 105 is not sufficiently clean for adhesion of applied coatings.

Adhesion of the UV curable coating 115 to the porous panel product 105 may also be increased by the application of water-based tie coat (820). Thus, in certain embodiments, the methods further comprise applying a water-based tie coat (820) to the porous wood product (105). Thus the application step would take place just before the application of the first layer of the UV-curable coating (110). The application of the water-based tie coat (820) is recommended if the porous wood product (105) is poorly pressed.

Prior to finishing the sealed porous wood product (105) with paint or other finishing products (190), the methods may further comprise modifying (860) the surface of the porous wood product (105), resulting in a varied surface (175). In some embodiments, the modification (860) enables the surface of the sealed porous panel product (105) to be stained. The modification (860) may merely be sanding the surface of the sealed porous wood product (105) to smooth the sealed surface for finishing, for example, by using 220 grit, 320 grit, or 400 grit sandpaper or sand disk. Modifying (860) the surface of the sealed porous wood product may also introduce varied surface (175) as decorative patterns for the porous wood product, for example, a finished appearance that mimics wood grains 180, like the hardwood veneer (see FIGS. 1, 5, and 6). The wood grains (180) appearance may be etched or embossed onto the surface of the porous wood product (105). The porous wood product (105) may be etched by laser or by chemicals. The wood grains (180) appearance may also be made on the surface of the porous wood product (105) by sandblasting.

In one embodiment, the surface of the sealed porous panel product 105 may be etched with 24 grit to 80 grit sandpaper or sanding belt to produce the decorative pattern (e.g., wood grains 180) that mimics the grains of mahogany wood. In a preferred embodiment for generating the appearance wood grains 180, the sandpaper or sanding belt used for mimicking actual wood grains is between 60 grit to 80 grit. The pressure of the sanding affects the final wood grain 180 appearance. Sanding deeper into the sealed porous panel product 105 will result in a dark appearance. On the other hand, sanding lighter into the sealed porous panel product 105 will produce lighter appearance and also lighter definition of the mimicked wood grains 180.

In other embodiments, an embosser may be used to modify the surface of the porous wood product (105) to give the appearance of wood grains (180) that has patterned grains, such as oak. In some embodiments, a laser may be used to etch the surface of the porous wood product (105) to give either the unpatterned wood grain (180) pattern like that of mahogany or patterned wood grain (180) pattern like that of oak. In some implementations, an actual image of a wood pattern (for example cherry wood or oak wood) may be the basis for embossing pattern. Thus the embossing cylinder of the embosser may be laser or router etched with the actual image of the wood pattern to reproduce the actual image onto the surface of the porous wood product (105) as wood grain (180). In implementations where the modification of the surface of the porous wood product (105) comprises embossing, sanding the surface of the porous wood product (105), for example, by using 220 grit, 320 grit, or 400 grit sandpaper or sand disk may take place before or after the embossing.

Unlike porous wood products (105) that are not treated with the disclosed preparation process, the porous wood product (105) may be stained with any wood strain. Thus either water-based or solvent-based stain may be used on the porous wood product (105). Accordingly, oil stains, varnish stains, water-based stains, gel stains, lacquer stains, water-soluble dye stain, or metal-complex (metalized) dye stains may be used to stain the porous wood product. The porous wood product (105) may be further finished (870) by the application of a varnish or surface film that seals the stain. In some embodiments, the varnish or surface film is a coating. In some embodiments, the varnish or surface film is a finish coating (190).

FIGS. 9-11 describe non-limiting examples of application weights, curing energies, and curing amounts for the first UV-curable coating 110, the optional second UV-curable coating 120, and the optional third UV curable coating 130.

The present disclosure is further illustrated by the following examples that should not be construed as limiting. The contents of all references, patents, and published patent applications cited throughout this application, as well as the Figures, are incorporated herein by reference in their entirety for all purposes.

EXAMPLES

Example 1. Comparison of Finished Products Treated or Untreated with the Disclosed Preparation Process Porous wood products (105) were finished with one coat of a pigmented conversion varnish was spray-applied at three wet mils without any sealing treatment or over a sealed surface. The sealed surface was produced by with application of three UV-curable coatings (115) applied via roll coaters. The first layer of a UV-curable coating (110) was partially cured at 65% before the application of a second UV-curable coating (120). The second layer of UV-curable coating (120) was partially cured at 60% before the application of a third UV-curable coating (130), which was partially cured at 80%. The coated surface was then sanded (860) with 320 grit sandpaper using a sanding machine.

The finished porous wood product (105) treated with preparation process of the disclosure has better color uniformity compared the finished porous wood product (105) that did not receive the treatment. The whiteness and sheen are more evenly distributed on the porous wood product (105) treated with the preparation process of the disclosure. The treatment also provided a smoother finished surface. The finished porous wood product (105) treated with the preparation process of the disclosure also has greater chemical and water resistance properties than the product that did not receive the treatment.

Example 2. Comparison of Finished Products Treated with Just a Primer and Treated with a Primer and the Disclosed Preparation Process For a porous wood product (105) that was treated using just a primer, two coats of a pigmented primer were spray-applied at three wet mils per application to the untreated surface, then sanded with 400 grit sandpaper. The surface was finished with one coat of a pigmented conversion varnish spray-applied at three wet mils. For the porous wood product (105) that was treated with the preparation process of the disclosure, the sealed surface was produced by application of three UV-curable coatings (115, e.g., 110, 120 and 130) applied via roll coaters. The first layer of a UV-curable coating (110) was partially cured at 65% before the application of a second UV-curable coating (120). The second layer of UV-curable coating (120) was partially cured at 60% before the application of a third UV-curable coating (130), which was partially cured at 80%. One coat of a pigmented primer was spray-applied at three wet mils to the surface, then sanded (860) with 400 grit sandpaper. Lastly, one coat of a pigmented conversion varnish was spray-applied (870) at three wet mils to the surface to achieve the final finish coat (190).

A comparison between treated and untreated porous wood products demonstrates the superiority of the treated porous wood product (105) processed according to the disclosed methods compared to using multiple layers of spray-applied primer. Multiple layers of spray-applied primer do not provide the same finish properties as the treated porous wood product (105) processed according to the disclosed methods. The porous wood product (105) processed according to the disclosed methods has increased opacity, durability, a smoother appearance and feel, and used 50% less spray-applied primer.

Example 3. Comparison of Finished MDF Treated with to the Methods of the Prior Art and Treated with the Preparation Process of the Disclosure Methods for preparing MDFs in the prior art involve the application of primers, which is apparent as an additional layer on the fiberboard. The disclosed process, however, uses a UV curable coating (115) that does not add to the additional bulk while still smoothing the surface for the application of a finishing coating. In spite of primers essentially providing an additional layer to the MDF that should provide a smoother surface for the finishing coating, the surface produced by disclosed methods provides a smoother and higher quality surface for the finishing coating producing a MDF product that is similar in quality to real wood. This is made apparent by comparing the reflection of light on the finished MDF treated with to the methods of the prior art and on the finished MDF treated with the preparation process of the disclosure. The reflection on the finished surface from an MDF treated with the preparation process of the disclosure provides nearly a mirror-like reflection. On the other hand, the finished MDF that was primed (rather than prepared by the process of the disclosure) has a rough surface that shows a heavily distorted reflection. Accordingly, preparing the porous wood product according to the methods of the disclosure improves the flow, leveling, sheen uniformity, and smoothness of the finishing coating.

Example 4: The Finished Porous Wood Product Treated with the Preparation Process of the Disclosure is Modified and Stained to Look Like Mahogany The finished porous wood product (105) treated with the preparation process of the disclosure may be further finished with a staining treatment. The surface of a finished MDF was etched (860) using sandpaper to introduce the appearance of mahogany grains prior to the application of the stain. The grains were introduced onto the surface of the MDF using sandpaper between 60 grit to 80 grit. Because the MDF was treated with the disclosed preparation process and only partially cured prior to the application of the stain, the stain was able to absorb into the porous wood product (105) completely and can show grain definition. The partially curing process of the disclosure allows the porous wood product (105) to have both a "hard" and "soft" surface that is very similar to a true hardwood like mahogany. These differences in hard and soft allow the stain product to penetrate at different rates thus giving a "natural" appearance.

What is claimed is:

1. A method of preparing a porous wood product for painting or staining to improve chemical resistance and/or water resistance properties of the porous wood product, the method comprising:
   a. applying to the porous wood product a coat of UV-curable coating;
   b. partially curing the UV-curable coating;
   c. applying onto the partially cured porous wood product a top UV-curable coating; and
   d. partially curing the top UV-curable coating to 80-95% cure,
   wherein the topmost UV-curable coating is not fully cured; and
   the improved chemical resistance and/or water resistance properties result in increased resistance to warping, expansion, shrinkage, and/or water damage.

2. The method of claim 1, wherein the porous wood product has one or more side portions and wherein the UV-curable coating is spray-applied to the one or more side portions.

3. The method of claim 1, wherein at least two UV-curable coatings are applied prior to applying the top UV-curable coating and the combined application weight for all UV-curable coatings is selected from the group consisting of: 28-100 g/m$^2$, 28-120 g/m$^2$, 45-120 g/m$^2$, and 45-180 g/m$^2$.

4. The method of claim 1, further comprising applying a water-based tie coat to the porous wood product prior to applying a UV-curable coating, and wherein the UV-curable coating is partially cured to 50-70% cure, and the top UV-curable coating is cured to 85-95% cure.

5. The method of claim 1, wherein the UV-curable coatings are spray-applied and comprise 10-40% filler based on the total weight of the coating compositions, with the top UV-curable coating cured to 85-95% cure.

6. The method of claim 1, wherein the UV-curable coating comprises 20-40% filler based on the total weight of the coating composition.

7. The method of claim 1, wherein the top UV-curable coatings comprises at least one filler selected from the group consisting of: CaCO3, silica, talc, silicone, Kaolin Clay, feldspar, titanium dioxide, and nepheline syenite.

8. The method of claim 7, wherein the filler is feldspar.

9. The method of claim 1, wherein the UV-curable coating comprises, based on the total volume of the coating composition:
   a. Amine Modified Polyether Acrylate: 25-45%;
   b. Dipropylene Glycol Diacrylate: 36-60%;
   c. nepheline syenite: 7-30%;
   d. Feldspar: 6-30%;
   e. 2-Hydroxy-2methyl-1-phenyl-1-propanone: 0.5-3%;
   f. 1-hydroxy-cyclohexyl-phenyl-ketone: 0.5-3%; and
   g. Benzophenone: 0.5-3%.

10. The method of claim 1, wherein a wood grains appearance is embossed onto the surface of the porous wood product or etched by laser or by chemicals onto the surface of the porous wood product.

11. A method of preparing a porous wood product for painting or staining to improve chemical resistance and/or water resistance properties of the porous wood product, the method comprising:
   a. applying to the porous wood product a top UV-curable coating, wherein the top UV-curable coating comprises at least one filler; and
   b. partially curing the top UV-curable coating to 70-95% cure,
   wherein the topmost UV-curable coating is not fully cured; and
   the improved chemical resistance and/or water resistance properties result in increased resistance to warping, expansion, shrinkage, and/or water damage.

12. The method of claim 11, wherein the top UV-curable coating is spray-applied and the filler is selected from the group consisting of: CaCO3, silica, talc, silicone, Kaolin Clay, feldspar, titanium dioxide, and nepheline syenite.

13. The method of claim 12, wherein filler is feldspar.

14. The method of claim 11, wherein the top UV-curable coating is applied with an application weight of 65-85 g/m$^2$ if one UV-curable coat is applied; 45-65 g/m$^2$ per layer if two UV-curable coats are applied; and 35-55 g/m$^2$ per layer if three UV-curable coats are applied.

15. The method of claim 11, further comprising the step of spray-applying between two and four UV-curable coatings, sanding each UV-curable coating after partially curing, and applying a finishing coating of paint or stain to the sanded and partially cured top UV-curable coating.

16. The method of claim 11, wherein the UV-curable coating further comprises a photoinitiator selected from the group consisting of: 0.5-3% 2-Hydroxy-2methyl-1-phenyl-1-propanone, 0.5-3% 1-hydroxy-cyclohexyl-phenyl-ketone, and 0.5-3% Benzophenone; wherein the % of the photoinitiator is weight % based on the total volume of the coating composition.

17. The method of claim 11, wherein the UV curing energy of the top UV-curable coating is 435-583 mJ/cm$^2$.

18. The method of claim 11, wherein the top UV-curable coating comprises at least one monomer additive selected from the group consisting of: DPGDA, HDODA, TRPDGA, TMPTA, TMPTMA, TPGDA, HDDA, and PETA.

19. The method of claim 11, wherein the UV-curable coating comprises 10-40% filler based on the total weight of the coating composition.

20. The method of claim 11, wherein a wood grains appearance is embossed onto the surface of the porous wood product or etched by laser or by chemicals onto the surface of the porous wood product.

* * * * *